United States Patent Office 3,583,883
Patented June 8, 1971

3,583,883
METHOD OF DECORATING GLAZED GLASS-CERAMIC BODIES
Peter Grego and Robert G. Howell, Corning, N.Y., assignors to Corning Glass Works, Corning, N.Y.
No Drawing. Filed Jan. 6, 1969, Ser. No. 789,375
Int. Cl. C03c 17/26
U.S. Cl. 117—123          8 Claims

ABSTRACT OF THE DISCLOSURE

This invention relates to the stain coloring of glazed glass-ceramic articles, which have a crystalline interlayer between the glass-ceramic underbody and the glaze, by an ion exchange process wherein silver and/or copper metal coloring ions are exchanged for alkali metal ions in the glaze, and the colors produced are related to the ion exchange firing schedule, the composition of the staining paste, and the refiring schedule, if any.

BACKGROUND OF THE INVENTION

The invention of glass-ceramic materials, as disclosed in U.S. Pat. No. 2,920,971, provided a new family of materials; and U.S. Pat. No. 3,146,114 provided a new family of glass-ceramics in the ternary system of $$Na_2O \cdot Al_2O_3 \cdot SiO_2$$

which have been found to be particularly useful for dinnerware. It was also found that by glazing those glass-ceramic materials improved durability and strength could be provided. Such glazes are disclosed in U.S. Pat. No. 3,384,508. That patent teaches that glazes of a particular composition, when fired on the glass-ceramic body, react and form a crystalline interlayer between the amorphous glaze and the glass-ceramic substrate. This crystalline interlayer extends into the glaze and the glass-ceramic substrate so as to provide a strong bond therebetween. By virtue of this interlayer, large differences in the coefficient of expansion of the glaze and underbody can be tolerated so as to allow high compressive stresses to be developed in the glaze. The glaze is essentially non-porous and amorphous, and consists essentially of, on a weight percent basis, 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO and 0–9% MgO, with the total of the alkali metal oxides not exceeding 16%.

It is highly desirable to decorate these glazed glass-ceramic articles so as to provide a more attractive appearance. The standard techniques for decorating glasses and/or glass-ceramic articles are enameling, diffusing, and staining. In general, those techniques which are suitable for glasses or glass-ceramics are not suitable for the glazed glass-ceramic applications since those techniques do not provide the desired colors, durability, coefficient of expansion, or other properties. Certain of these un-desirable properties could lead to porosity, or microchecks, in the surface of the body, which are a hazard to health and sanitation since they can act as sites for bacteria growth.

Therefore, it was necessary to devise suitable techniques for decorating glazed glass-ceramic articles.

SUMMARY OF THE INVENTION

We have discovered that glazed glass-ceramic articles having a crystalline interlayer can be stain-colored and decorated by an ion exchange process wherein silver and/or copper metal coloring ions are exchanged for the alkali metal ions in the glaze. This process allows us to produce a variety of colors while maintaining the desirable characteristics of the glazed glass-ceramic article. Moreover, it is believed that glazed articles without the crystalline interlayer cannot be similarly stain-colored. Furthermore, we have discovered that by particular heat treatments we can obtain a variety of colors. We have also found that after certain colors have been developed they may be changed by refiring the body at a temperature higher than the highest prior firing temperature. However, all glazes which produce the crystalline interlayer cannot be used. Therefore, we have found that in addition to the other compositional limitations the glaze must contain a total of at least three percent by weight, $K_2O$ and $Na_2O$.

DESCRIPTION OF THE PREFERRED EMBODIMENT

The chemical composition of the underbody, or glass-ceramic base, is not believed to have any effect upon the stain-coloring of the glazed glass-ceramic article. Thus, as indicated in U.S. Pat. No. 3,384,508, any of the glass-ceramic compositions disclosed in U.S. Pat. No. 2,920,971 or 3,146,114 may be utilized as underbodies. However, as disclosed in 3,146,114, it has been found that in the dinnerware field glass-ceramics wherein nepheline is present as one of the primary crystal phases, and especially where nepheline and celsian together constitute the primary phases, are the most desirable bodies. The composition of several of the more desirable bodies are set forth below, in Table I, in weight percent.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 56.0 | 71.0 | 25.0 | 56.0 | 40.0 | 48.0 | 43.4 | 63.0 | 20.0 | 35.0 | 25.0 | 20.0 | 50.0 |
| $Al_2O_3$ | 20.0 | 18.0 | 45.0 | 40.0 | 40.0 | 19.0 | 30.3 | 20.0 | 45.0 | 50.0 | 45.0 | 60.0 | 26.1 |
| $TiO_2$ | 9.0 | 4.5 | | | | 10.0 | 5.7 | | | | | | 4.5 |
| MgO | 15.0 | 3.0 | | | | 22.0 | | 9.0 | | 13.0 | | | 2.2 |
| ZnO | | 1.0 | | | | | | | | | | | |
| $Li_2O$ | | 2.5 | | | | | | | | | | | |
| $P_2O_5$ | | | 13.0 | | | | | | 15.0 | | 10.0 | 16.0 | |
| $ZrO_2$ | | | 15.0 | | | | | 8.0 | 17.0 | | 15.0 | 2.0 | |
| $Na_2O$ | | | 2.0 | | 1.0 | 14.1 | | | | | | | 17.2 |
| $K_2O$ | | | | 4.0 | | | | | | 3.0 | 2.0 | | |
| BaO | | | | | 20.0 | | 6.5 | | | | 5.0 | 2.0 | |

We have found that the glaze composition must be within the range disclosed in U.S. Pat. No. 3,384,508. However, we have also found that the glaze must contain by weight, at least 3% $K_2O$ and $Na_2O$ otherwise the number of alkali ions which exchange with the metal coloring ions are insufficient and little, if any, stain-coloring will take place. Although $Na_2O$ can be as low as 1.5% we prefer to have at least 3% $Na_2O$ in the glaze. The glaze when fired and matured onto a glass-ceramic underbody apparently reacts with the body so as to produce a crystalline interlayer between the glaze and underbody. The crystals of the interlayer extend into the underbody and into the glaze. Normally, the matured glaze has a thickness of from .004 to .010 inch. The composition of several of the preferred glazes is set forth below in Table II.

TABLE II

| | 1 | 2 | 3 | 4 | 5 | 6 | 7 |
|---|---|---|---|---|---|---|---|
| $SiO_2$ | 46.3 | 47.7 | 47.7 | 47.7 | 69 | 46.8 | 69 |
| $Na_2O$ | 3.8 | 4.0 | 4.0 | 3.0 | 15 | 5.2 | 11 |
| $Al_2O_3$ | 6.6 | 7.4 | 7.4 | 7.4 | 5 | 9.2 | 5 |
| $B_2O_3$ | 14.8 | 9.8 | 9.8 | 9.8 | 11 | 10.6 | 11 |
| $K_2O$ | 1.5 | 1.0 | | 1.0 | | 1.9 | |
| CaO | 11.8 | 8.2 | 9.2 | 7.9 | | | 4 |
| $ZrO_2$ | 0.5 | 0.8 | 0.8 | 0.8 | | | |
| CdO | 0.5 | | | 0.3 | | | |
| PbO | 14.2 | 21.1 | 21.1 | 21.1 | | 17.8 | |
| $CaF_2$ | | | | 1.0 | | 8.5 | |

The mechanism by which this stain-coloring of glazed glass-ceramics takes place is not completely understood. In glass, there is a substitution of one metal coloring ion for one alkali metal ion and as a result thereof a color center will form and grow to a particular size. The size of the color center will not vary significantly as a result of any post-ion exchange treatment of the glass. In the glazed glass-ceramic body it is believed that there is a substitution of one metal coloring ion for one alkali metal ion as there is in glass. However, in certain staining-paste composition ranges, it is thought that the size of the color center changes with changes in the ion exchange firing schedules and post-treatments of the body. These changes are apparently related to the crystalline interlayer but in what manner and to what extent is not presently known. Variation in the ion exchange firing schedule and any refiring of these particular stain-colored glazes results in a change in the color, which is believed to be related to a change in the color center size. This color change is extremely unusual when it is considered that the glaze has an amorphous structure similar to that of glass and that the stain-coloring takes place entirely within the amorphous glaze structure and apparently not within the crystalline interlayer. In glasses the intensity, but not the color, can be varied with changes in the ion exchange firing schedule and refiring. However, there is no change in color in glasses as there can be in glazed glass-ceramics. Thus, there are changes which can take place in stain-colored glazed glass-ceramics that do not take place in stain-colored glasses.

We have found that when the crystalline interlayer is not present we cannot obtain particular features of our invention; as for example when the glazes are applied to metal substrates or to non-interlayer forming glass-ceramic substrates. Thus, those features must be related to the crystalline interlayer which has formed. The maximum depth of the stain-colored surface is approximately 40 microns and the glaze is approximately .004 to .010 inch thick. Thus it is apparent that the stain-coloring does not extend into the crystalline interlayer, so that the phenomena is not believed to be explainable by the staining of the crystalline interlayer or other direct interaction between the stain and interlayer.

The staining paste of our invention contains silver containing compounds and/or copper containing compounds in a finely divided fluid media. The copper and silver containing staining pastes have been formulated so that the silver content thereof is from 3.0 to 71.5 weight percent, of the total dry solids, and the copper content thereof is from 2 to 50 weight percent of total dry solids. In these pastes the weight ratio of silver to copper is between 1:4 and 15:1 with the total amount of copper and silver being between 25% and 80%. Normally, we prefer to use compounds such as silver sulfide ($Ag_2S$) and copper sulfide (CuS) although the sulfates, chlorides, and other similar compounds may be used. When the sulfides are used, the silver sulfide is from 5.75 to 80 weight percent and the copper sulfide is from 2.75 to 75 weight percent of the total dry solids. The weight ratio silver sulfide to copper sulfide is between about 1:6 and 12:1, with the total amount of both in the paste being between about 35 and 95% by weight.

Copper stains can produce, depending upon treatment, red or yellow stain colors. On the other hand, copper-silver stains within the aforementioned ranges, can produce, depending upon treatment, amber, blue or green colors. By refiring at a higher temperature the amber can be changed to a blue or green and the blue can be changed to a green. The range of blue and green colors which can be produced are defined according to the I.C.I. system of color coordinates, using a C illuminant. According to that system, trichromatic values are represented as $x$, $y$, and $z$ the sum of which equals 1.0000. The $x$ and $y$ values are exressed in coefficients representing the maximum and minimum. The other coordinate $z$ is equal to 1.0000 minus the sum of $x$ and $y$. The color coordinates for the blues can be defined as where $x$ is greater than .2750 and less than .2814 with $y$ greater than .2753 and less than .3057. The greens can be defined as $x$ greater than .2842 and less than .3550 with $y$ greater than .3250 but less than .4250. The ambers which are produced have the color coordinates $x$ greater than .4353 and less than .5039 with $y$ greater than .3637 but less than .4557.

The paste in addition to containing the metal coloring ion compounds also contain diluents, dispersants, plasticizers, and wetting agents. These plasticizers, dispersants, and wetting agents are added in such amounts as are, known to those of ordinary skill in the art, to make uniform paste of the proper viscosity for application. Typical plasticizers include bentonite, Carbowax 20M and/or lignosulfonate; while typical wetting agents include isobutyl alcohol, ethyl alcohol and/or water. $Al_2O_3$ is a preferred diluent. The coating is applied in thicknesses between .002 and .005 inch thick. If the coating is less than .002 of an inch, the stain begins to become pale, if greater than .005 of an inch, the paste leaves a hard mud flat type of crust on the surface. However, it should be recognized that these are preferred ranges and not specific limitations. We prefer to spray the paste onto the surface although other methods of application can be used. For example, the paste can also be applied by flow coating, dipping, and screening. Table III below sets forth 12 different staining pastes which are exemplary of those which may be used.

TABLE III

| | 1 | 2 | 3 | 4 | 5 | 6 | 7 | 8 | 9 | 10 | 11 | 12 |
|---|---|---|---|---|---|---|---|---|---|---|---|---|
| $Ag_2S$, g | 34.5 | 6.0 | 57.5 | 34.5 | 24.5 | 80.0 | 65.0 | 50.0 | 46.0 | 35.0 | 35.0 | 20.0 |
| CuS, g | 6.0 | 34.5 | 10.0 | 3.0 | 12.0 | 15.0 | 30.0 | 45.0 | 21.0 | 32.0 | 60.0 | 75.0 |
| $Al_2O_3$, g | 60.5 | 60.5 | 32.5 | 63.5 | 63.5 | | | | 30.0 | 30.0 | | |
| Bentonite, g | 1.0 | 1.0 | 1.0 | 1.0 | 1.0 | 5.0 | 5.0 | 5.0 | 3.0 | 3.0 | 5.0 | 5.0 |
| Water, ml | 150.0 | 150.0 | 150.0 | 150.0 | 150.0 | 50.0 | 50.0 | 50.0 | 125.0 | 125.0 | 125.0 | 125.0 |

After application the paste is dried so as to remove water and any other volatile constitutents before the ion exchange firing. Drying can be carried out at temperatures between room temperature and about 120° C. for times between about 10 and 30 minutes.

The coated body is then heated to a temperature between the lowest temperature at which a uniform ion exchange will take place and the temperature at which the glaze will soften. We have found that little, if any, ion exchange is effected at temperatures less than 550° C. and that if any exchange is effected, it is non-uniform. Perhaps at unreasonably long lengths of time at temperatures below 550° C. a uniform exchange will take place. Above about 800° C. most of the glazes become soft and begin to deform. Thus, 800° C. is the maximum practical firing temperature. The paste and body are held at the particular ion exchange firing temperature for a sufficient length of time to affect the exchange. In most instances, that length of time is between 5 minutes and 2 hours depending on the color desired. At times less than 5 minutes little, if any, stain coloring takes place whereas at times longer than 2 hours a hazy surface is developed. With all other parameters held constant, various colors can be produced by ion exchange firing the paste and body at different temperatures between 550° and 800° C. The length of time of firing has less affect on the color than the change in temperature, but changes in time do affect the hue. Thus, in the copper-silver system by varying the ion exchange firing schedule, a variety of colors and hues can be produced.

The depth of the ion exchanged layer can vary from between about 1 to 50 microns, depending upon treatment. In the copper-silver strains the reducing conditions within the glaze are sufficient to reduce the monovalent coloring ion to the metal ion. Thus, there is no need for the subsequent conventional heat treatment to reduce the metal ion to an atom so as to produce a color. The colors which are produced by this treatment are amber, blue, and green. When using only a copper stain it is necessary to utilize a reduction heat treatment in a mild reducing atmosphere such as sulfur dioxide or 20% hydrogen and nitrogen mixture. The colors produced with copper alone are yellow and red.

We have quite unexpectedly discovered by refiring the copper-silver ion exchanged body at a temperature greater than the highest prior firing temperature a color change can be produced. In view of the experience with glass and the similarity between glasses and the glazes, these results are totally unexpected and unexplainable. In order to obtain these color changes, the body must be fired at a temperature between 550° and 800° C. for periods of time from 5 to 60 minutes, and at a temperature above the highest prior firing temperature. The color produced by the refire is similar to that color which could be produced if the body were originally ion exchanged at the refire temperature. For example, a green may be obtained by firing at 700° C. initially or through a series of firings up to 700° C. However, there may be a slight difference between the colors produced by the different firings. The length of time necessary to affect the color change by refiring is usually shorter than that necessary if the body were originally ion exchanged at the same temperature. We have found there to be no limitation as to the number of refirings that a body may be subjected to provided, of course, the treatments meet the aforementioned limitations. It is theorized that these changes in color are produced by the change in size of the color center. However, the mechanism by which this color center changes in size is not understood in view of the fact that this glaze is so similar to a glass and this phenomena cannot be produced in glass, or in glazed bodies having no intermediate crystalline interlayer. Thus, the only explanation can be the presence of the crystalline interlayer.

In general, in the copper-silver staining system depending upon the exact composition of the paste, amber colors are produced by firing or refiring between about 550° and 600° C. Blues can be produced in the silver rich compositions between about 600° and 700° C. and greens between about 700° and 800° C. In the copper rich copper-silver systems greens are produced between about 600° and 800° C.

Our invention is further illustrated by the following examples:

Example I

A glass-ceramic substrate was prepared by melting a glass batch consisting essentially of, in weight percent on the oxide basis, 43% $SiO_2$, 30% $Al_2O_3$, 13.8% $Na_2O$, 5.6% BaO, 6.5% $TiO_2$, and 0.9% $As_2O_3$. The melt was then formed into the shape of a dinner plate and then cerammed. A glaze of the following composition 47.6% $SiO_2$, 7.5% $Al_2O_3$, 3.0% $Na_2O$, 9.7% $B_2O_3$, 0.5% F, 1.2% $K_2O$, 8.2% CaO, 21.2% PbO, 0.3% CdO, and 0.8% $ZnO_2$ was prepared and fired onto the cerammed dinner plate, thus forming a completed dinner plate. Next a high silver-low copper staining paste of the following composition was prepared 34.5 grams $Ag_2S$, 6.0 grams CuS, 60.5 grams $Al_2O_3$, 1.0 gram bentonite and 150 ml. water. This was ball milled into a sprayable slurry and sprayed onto the glazed plate and then allowed to air dry. The dry coated plate was then ion exchange fired in an air atmosphere in an electric furnace at 600° C. for 5 minutes. The plate was then cooled and the residue removed. The plate was an amber color having the following color coordinates: $x=0.4778$, $y=0.4268$, and $z=0.0954$.

Example II

An amber stain colored body was prepared as in Example I. However, the body was refired at 650° C. for 30 minutes and the amber color was converted to a deep blue having the following color coordinates: $x=0.2789$, $y=0.2802$, and $z=0.4409$.

Example III

A glazed glass-ceramic body was coated with a staining paste as in Example I. The coated body was allowed to air dry and was then ion exchange fired in an air atmosphere at 700° C. for 30 minutes. The resultant color was green and had the following color coordinates: $x=0.3060$, $y=0.3494$, and $z=0.3446$.

Example IV

The green stain colored body as produced in Example III was refired at 800° C. The resultant color was a light green having the color coordinates of: $x=0.3340$, $y=0.3709$, and $z=0.2950$.

Example V

A glazed glass-ceramic dinner plate was prepared as in Example I. A high copper-low silver staining paste of the following composition was prepared: 6.0 grams $Ag_2S$, 34.5 grams CuS, 60.5 grams $Al_2O_3$, 1.0 gram bentonite and 150 ml. water. The paste was sprayed onto the body and allowed to air dry. The coated body was ion exchange fired at 550° C. for 60 minutes. After cooling and cleaning, the body was found to have an amber color. The body was then refired at a temperature of 600° C. and was found to have an olive green color having color coordinates of: $x=0.3500$, $y=0.4200$, and $z=0.2300$.

Example VI

A coated glazed glass-ceramic body as in Example V was ion exchange fired at 700° C. for 30 minutes. After cooling, the body was found to have a green color.

Example VII

The amber stain colored body of Example V was refired at a high temperature of 750° C. The resultant color was a green.

Example VIII

The stain colored body of Example VII was refired at a high temperature of 800° C. and was found to have a yellowish-green color.

Example IX

A glazed glass-ceramic dinner plate was prepared as in Example I. A copper staining paste of the following composition was prepared: 60 grams CuS, 15 grams sulfur, 24 grams $Al_2O_3$, 1 gram bentonite and 100 ml. water. The paste was sprayed onto the body and allowed to air dry. The coated body was fired in air at 650° C. for 15 minutes. After cooling and cleaning, the body was found to have a bright yellow color.

Example X

The coated body of Example IX was fired in a $SO_2$ atmosphere for 30 minutes. After cleaning the stain color was a light yellow. The bright yellow body was then refired in a 20% hydrogen-80% nitrogen atmosphere at 590° C. for 30 minutes. The resultant color was a brick red.

We claim:
1. A method of stain-coloring a glazed glass-ceramic article, having a crystalline interlayer, wherein said glaze consists essentially, on a weight percent basis, of 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO and 0–9% MgO with the total of the alkali metal oxides not exceeding 16%, and the total of $Na_2O$ and $K_2O$ being greater than 3% comprising the steps of:
  (A) coating the glazed surface with a staining paste containing both copper and silver coloring ions;
  (B) heating the coated glazed surface to a temperature between 550° C. and 800° C., for a length of time sufficient to exchange the copper and silver coloring ions with the alkali metal ions of the glaze.
2. The method of claim 1 wherein:
  (A) the copper coloring ion comprises in weight percent, of the total dry solids, between 2 and 50% of the staining paste, and
  (B) the silver coloring ion comprises in weight percent, of total dry solids, between 3.0–71.5% of the staining paste.
3. The method of claim 2 wherein the total amount of the metal coloring ions is between about 25 and 80% by weight, of the staining paste, as calculated from the total dry solids.
4. The method of claim 2 wherein the ion exchanged article is heated to a temperature higher than the highest prior firing temperature and between 550° C. and 800° C. for a length of time sufficient to change the color developed in the glass by the ion exchange.
5. A stain-colored glazed glass-ceramic article comprising a glass-ceramic underbody, a crystalline interlayer, and a glaze consisting essentially on a weight percent basis of 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CrF_2$, 0–2% ZnO and 0–9% Mgo with the total of the alkali metal oxides not exceeding 16% and the total of $Na_2O$ and $K_2O$ being greater than 3%, and wherein the surface of said glaze contains both copper and silver coloring ions.
6. An article as recited in claim 5 wherein the stain-colored surface is from 1 to 50 microns thick.
7. An article as recited in claim 5 wherein the stain-color is blue.
8. An article as recited in claim 5 wherein the stain-color is green.

References Cited

UNITED STATES PATENTS

| | | | |
|---|---|---|---|
| 2,662,035 | 12/1953 | Levi | 106—34X |
| 3,079,264 | 10/1961 | Grego et al. | 106—34 |
| 3,313,644 | 4/1967 | Morrissey | 161—1X |
| 3,384,508 | 5/1968 | Bopp et al. | 117—123(A) |
| 3,419,370 | 12/1968 | Cramer et al. | 117—118X |
| 3,420,698 | 1/1969 | Smith | 106—34X |

ALFRED L. LEAVITT, Primary Examiner

W. F. CYRON, Assistant Examiner

U.S. Cl. X.R.

117—124, 125